US012757862B2

(12) United States Patent
Jiang et al.

(10) Patent No.: US 12,757,862 B2
(45) Date of Patent: Oct. 13, 2026

(54) EXCREMENT COLLECTING BOX AND USING METHOD THEREOF

(71) Applicant: PETKIT Network Technology (Shanghai) Co., Ltd., Shanghai (CN)

(72) Inventors: Lihua Jiang, Shanghai (CN); Weike Guo, Shanghai (CN); Weixue Guo, Shanghai (CN); Xiaoqing Ma, Shanghai (CN); Junchao Zhang, Shanghai (CN)

(73) Assignee: PETKIT NETWORK TECHNOLOGY (SHANGHAI) CO., LTD, Shanghai (CN)

( * ) Notice: Subject to any disclaimer, the term of this patent is extended or adjusted under 35 U.S.C. 154(b) by 281 days.

(21) Appl. No.: 18/727,950

(22) PCT Filed: Oct. 26, 2023

(86) PCT No.: PCT/CN2023/126770

§ 371 (c)(1),
(2) Date: Jul. 10, 2024

(87) PCT Pub. No.: WO2024/198329

PCT Pub. Date: Oct. 3, 2024

(65) Prior Publication Data

US 2026/0248099 A1 Aug. 27, 2026

(30) Foreign Application Priority Data

Mar. 31, 2023 (CN) ......................... 202310334540.2

(51) Int. Cl.
*A01K 1/00* (2006.01)
*A01K 1/01* (2006.01)

(52) U.S. Cl.
CPC .................................... *A01K 1/011* (2013.01)

(58) Field of Classification Search
CPC ...... A01K 1/011; A01K 1/014; A01K 1/0107; A01K 1/0132

(Continued)

(56) References Cited

U.S. PATENT DOCUMENTS 3,545,171 A * 12/1970 Salomon ................. B65B 51/16 53/562
4,593,516 A * 6/1986 Alameda ................. B65B 51/00 53/138.3

(Continued)

FOREIGN PATENT DOCUMENTS

CN 203860199 U 10/2014
CN 107187638 A 9/2017

(Continued)

OTHER PUBLICATIONS

Office Action from related Japanese patent application No. 2024-576718 dated Dec. 3, 2025.

(Continued)

*Primary Examiner* — Richard T Price, Jr.
(74) *Attorney, Agent, or Firm* — McCarter & English, LLP

(57) ABSTRACT

An excrement collecting box and method for using the excementing collecting box are provided. The excrement collecting box includes a housing, a packaging component and a collecting bag. An opening is provided in the housing. The packaging component includes a first sliding rod, a second sliding rod and a hot melt cutting member, the first sliding rod and the second sliding rod being set at an angle, the first sliding rod and the second sliding rod being slidably disposed on the housing, the first sliding rod and the second sliding rod being capable of simultaneously sliding towards the hot melt cutting member or simultaneously sliding away from the hot melt cutting member, and the hot melt cutting member being securely connected to the housing. The (Continued)

collecting bag may pass through the opening and connect to the housing, the collecting bag being capable of being abutted by the first sliding rod.

16 Claims, 10 Drawing Sheets

(58) Field of Classification Search
USPC .......................................................... 119/161
See application file for complete search history.

(56) References Cited

U.S. PATENT DOCUMENTS

| | | | | |
|---|---|---|---|---|
| 4,970,987 | A | 11/1990 | Deyle | |
| 5,752,466 | A * | 5/1998 | Lundeen | A01K 1/0114 119/167 |
| 5,918,447 | A * | 7/1999 | Hanten | A22C 11/105 53/577 |
| 7,316,100 | B2 * | 1/2008 | Stravitz | B65F 1/062 53/567 |
| 9,750,225 | B1 * | 9/2017 | Makins | A01K 1/0047 |
| 2020/0236896 | A1 | 7/2020 | Noh | |

FOREIGN PATENT DOCUMENTS

| | | | |
|---|---|---|---|
| CN | 110089439 | A | 8/2019 |
| CN | 209628313 | U | 11/2019 |
| CN | 111603085 | A | 9/2020 |
| CN | 112273241 | A | 1/2021 |
| CN | 113525965 | A | 10/2021 |
| CN | 113665912 | A | 11/2021 |
| CN | 216071515 | U | 3/2022 |
| CN | 218142486 | U | 12/2022 |
| CN | 218313747 | U | 1/2023 |
| CN | 116326490 | A | 6/2023 |
| JP | 2009055892 | A | 3/2009 |
| KR | 102133031 | B1 | 7/2020 |
| KR | 20210102821 | A | 8/2021 |

OTHER PUBLICATIONS

Search Report from related European patent application No. 23895533.0 dated Sep. 29, 2025.

PCT International Search Report dated Jan. 28, 2024, for International Patent Application No. PCT/CN2023/126770.

First Office Action from related Chinese Patent Application No. 202310334540.2 issued Feb. 27, 2025.

First Search Report from related Patent Application No. 2023103345402 issued Feb. 27, 2025.

* cited by examiner

EXCREMENT COLLECTING BOX AND USING METHOD THEREOF

CROSS-REFERENCE TO RELATED APPLICATIONS

This patent application is a 35 U.S.C. § 371 National Stage filing based on International Application No. PCT/CN2023/126770, filed on Oct. 26, 2023, which application claims priority benefit to Chinese Patent Application No. 202310334540.2, filed with the China National Intellectual Property Administration (CNIPA) on Mar. 31, 2023, the disclosures of which are incorporated herein by reference in their entireties.

TECHNICAL FIELD

The present application relates to the technical field of pet toilets, for example, an excrement collecting box and a using method thereof.

BACKGROUND

In the related art, pet toilets are directly connected to the outside and pet excrement cannot be removed in time, resulting in the emission of odor. The related art provides a pet toilet that can handle excrement in time. After the pet goes to toilet, the padding or cat litter mixed with pet excrement is separated through a vibration device or a stirring device and discharged into the garbage bag, and the garbage bag is closed up so that the emission of odor is reduced. However, the device provided in the related art requires the user to manually seal the garbage bag after the pet finishes excretion each time, leading to poor user experience. In addition, the garbage bag that is manually sealed by the user is not tightly sealed, so a small amount of odor still escapes.

SUMMARY

The present application provide an excrement collecting box and a using method thereof, so as to solve the problem that pet toilets in the related art cannot seal the garbage bag in time.

The present application provides an excrement collecting box. The excrement collecting box is configured to collect pet excrement. The excrement collecting box includes a housing, a packaging component and a collecting bag. An opening is provided in the housing. The packaging component includes a first sliding rod, a second sliding rod and a hot melt cutting member, the first sliding rod and the second sliding rod are set at a preset angle, the first sliding rod and the second sliding rod are slidably disposed on the housing separately, the first sliding rod and the second sliding rod are capable of simultaneously sliding towards the hot melt cutting member or simultaneously sliding away from the hot melt cutting member, and the hot melt cutting member is securely connected to the housing. The collecting bag passes through the opening and is connected to the housing, the collecting bag is capable of being abutted by the first sliding rod, the second sliding rod and the hot melt cutting member, and the hot melt cutting member is configured to seal and cut the collecting bag.

The present application further provides a using method of an excrement collecting box, and the method is applied to the excrement collecting box in any of the preceding solutions. The using method of an excrement collecting box includes steps described below. The packaging component is driven to the sealing position. The hot melt cutting member is heated so that the collecting bag is sealed and cut.

REFERENCE LIST

Figure 1:
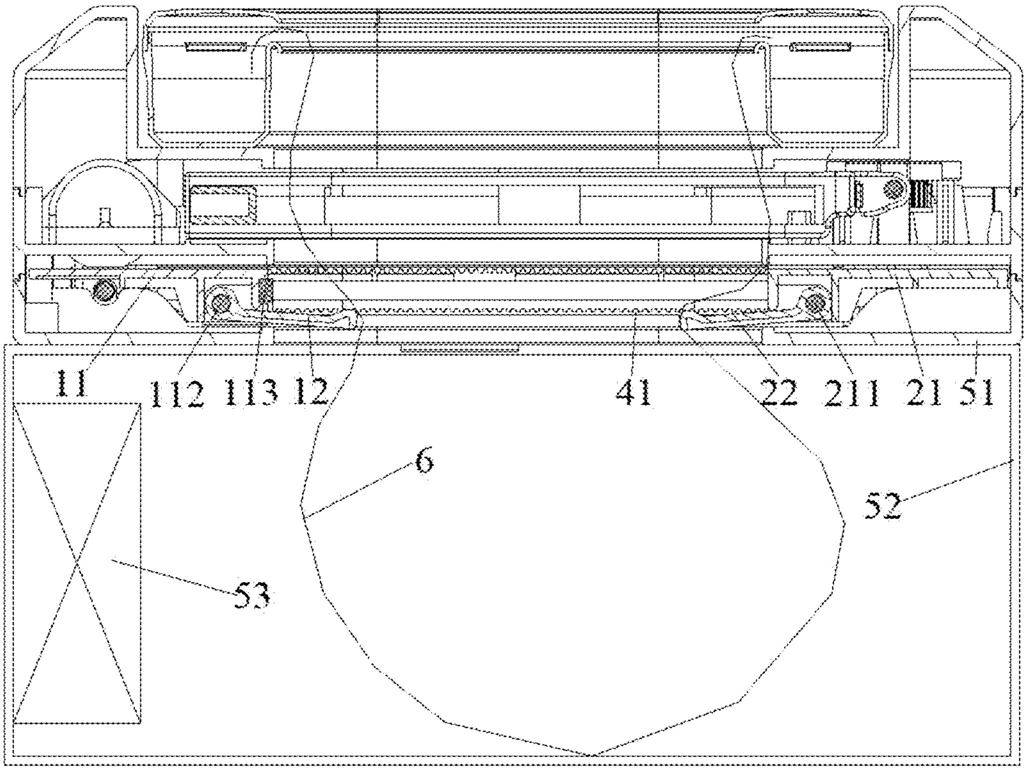
FIG. 1 is a side sectional view of an excrement collecting box according to an embodiment of the present application.

11 left side sealing portion
111 left side drive block
112 left side rotation shaft
113 sealing strip
114 first magnet
12 left side detection member
21 right side sealing portion
211 right side drive block
212 right side rotation shaft
22 right side detection member
31 drive unit
311 drive gear shaft
32 intermediate gear
33 output shaft
34 third pulley
41 third timing belt
42 third guide support shaft
51 housing
52 collecting box
53 negative pressure device
6 collecting bag
71 opened position sensor

72 closed position sensor
73 sealing position sensor
74 standby position sensor
81 packaging motor
811 motor case
821 first pulley case
822 first timing belt
823 first guide support shaft
831 second pulley case
832 second timing belt
833 second guide support shaft
84 first sliding rod
841 first drive block
842 second magnet
85 second sliding rod
851 second drive block

DETAILED DESCRIPTION

In the description of the present application, it is to be noted that orientations or position relations indicated by terms such as "center", "upper", "lower", "left", "right", "vertical", "horizontal", "in" and "out" are based on the drawings. These orientations or position relations are intended only to facilitate and simplify the description of the present application and not to indicate or imply that a device or element referred to must have such particular orientations or must be configured or operated in such particular orientations. Thus, these orientations or position relations are not to be construed as limiting the present application. Additionally, terms such as "first" and "second" are used only for the purpose of description and are not to be construed as indicating or implying relative importance. Terms "first position" and "second position" are two different positions. Moreover, when the first feature is described as "on", "above" or "over" the second feature, the first feature is right on, above or over the second feature, the first feature is obliquely on, above or over the second feature, or the first feature is simply at a higher level than the second feature. When the first feature is described as "under", "below" or "underneath" the second feature, the first feature is right under, below or underneath the second feature, the first feature is obliquely under, below or underneath the second feature, or the first feature is simply at a lower level than the second feature.

In the description of the present application, it is to be noted that unless otherwise expressly specified and limited, terms "mounted", "connected to each other" and "connected" are to be understood in a broad sense as "securely connected", "detachably connected" or "integrally connected"; "mechanically connected" or "electrically connected"; "directly connected to each other" or "indirectly connected to each other via an intermediary"; or "intraconnected between two components". For those of ordinary skill in the art, specific meanings of the preceding terms in the present application may be understood based on specific situations.

Embodiments of the present application are described in detail below. Examples of the embodiments described below are illustrated in the drawings, where the same or similar reference numerals throughout the drawings represent the same or similar elements or elements having the same or similar functions. The examples described below with reference to the drawings are illustrative and used only for explaining the present application and are not to be construed as limiting the present application.

In the related art, pet toilets are directly connected to the outside and pet excrement cannot be removed in time, resulting in the emission of odor. The related art provides a pet toilet that can handle excrement in time. After the pet goes to toilet, the padding or cat litter mixed with pet excrement is separated from the clean padding or cat litter through a vibration device or a stirring device and discharged into the garbage bag, and the garbage bag is closed up so that the emission of odor is reduced. However, the device provided in the related art requires the user to manually seal the garbage bag after the pet finishes excretion each time, leading to poor user experience. In addition, the garbage bag that is manually sealed by the user is not tightly sealed, so a small amount of odor still escapes.

In view of this, the embodiment provides an excrement collecting box. The excrement collecting box can also close up the collecting bag and can solve the preceding problem.

Figure 2:
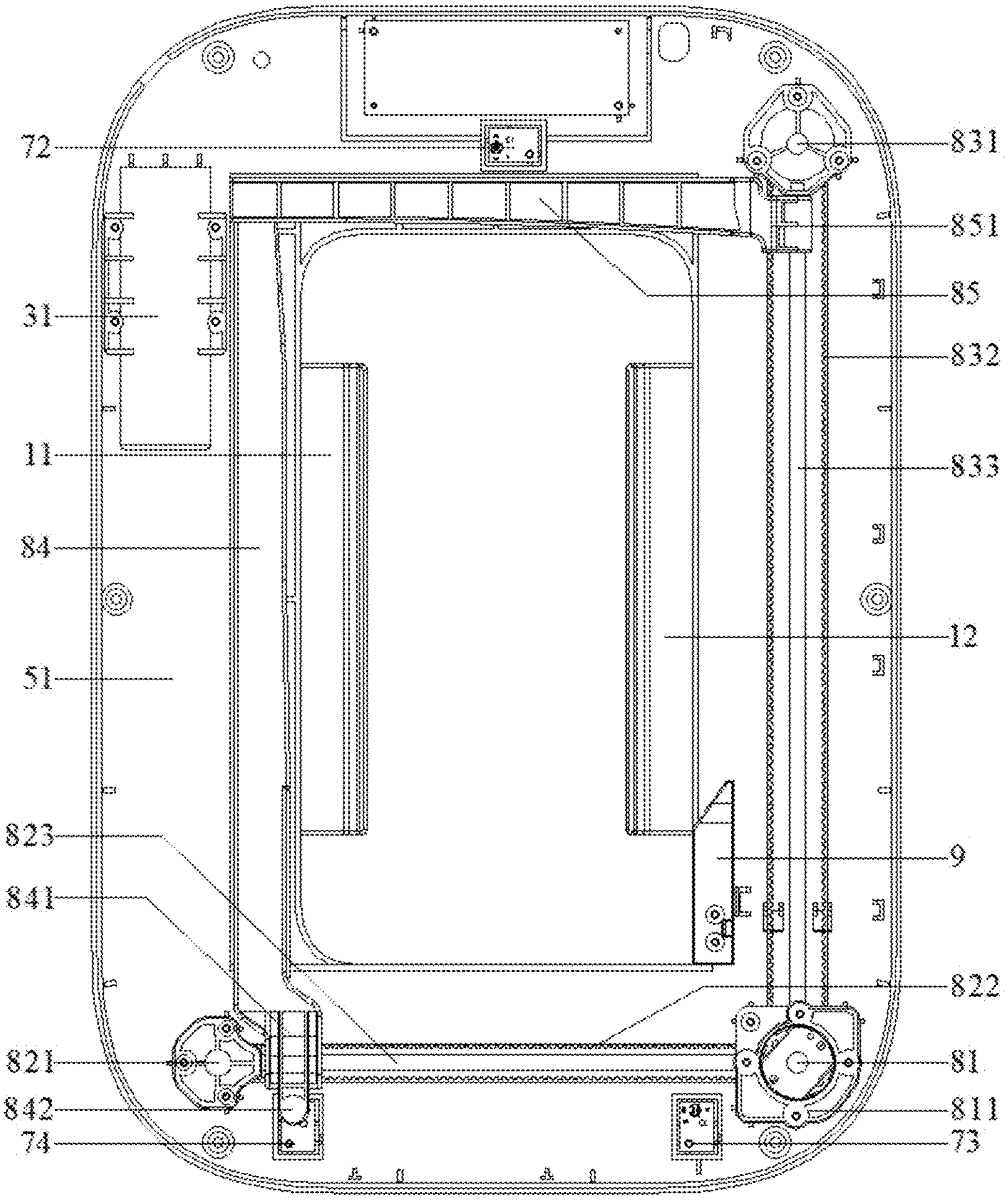
FIG. 2 is a structural view of a packaging component in a standby state according to an embodiment of the present application.
Figure 3:
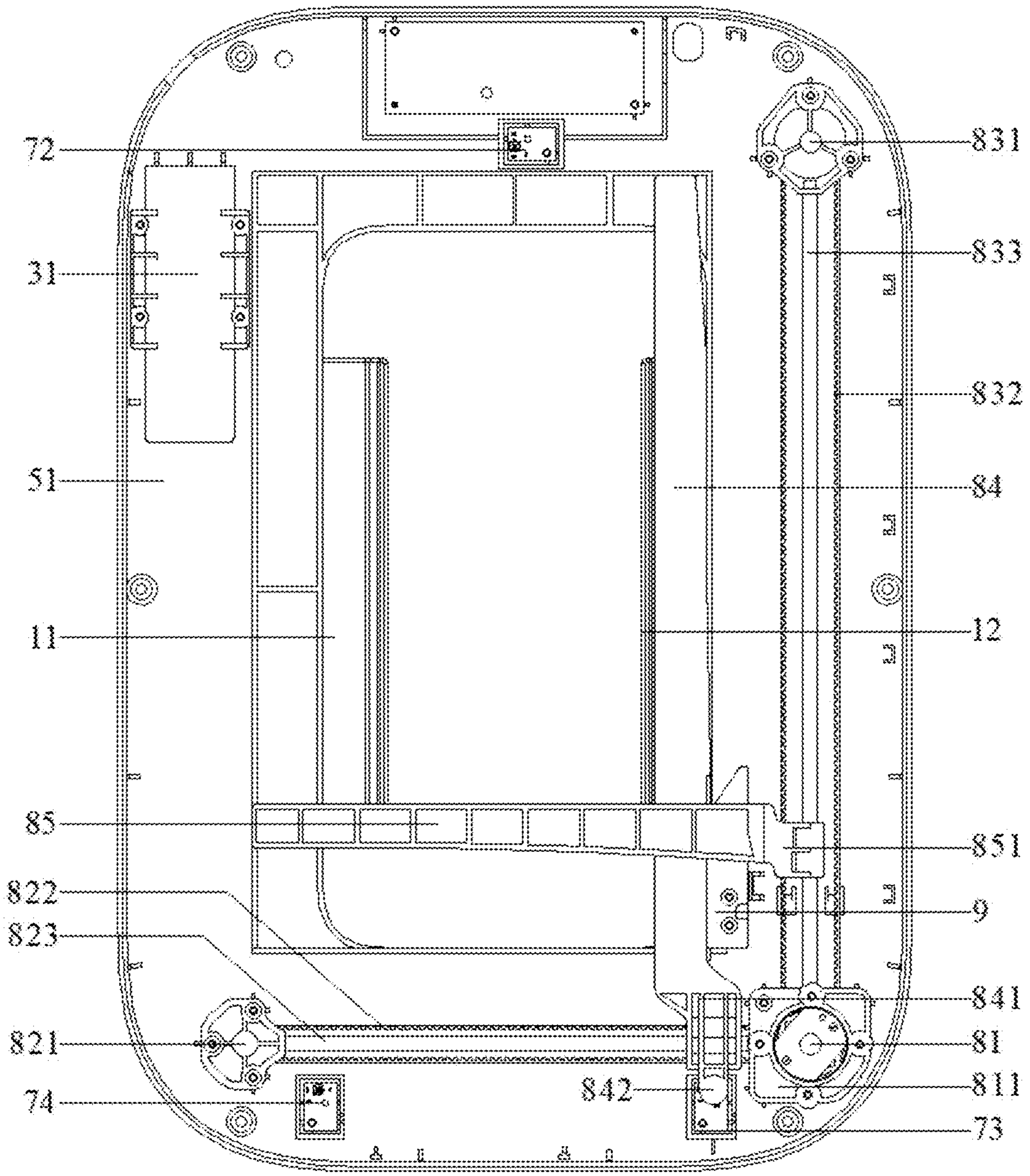
FIG. 3 is a structural view of a packaging component in a sealing state according to an embodiment of the present application.

As shown in FIG. 1 to FIG. 3, the present application provides an excrement collecting box. The excrement collecting box is configured to collect pet excrement. The excrement collecting box includes a housing 51, a packaging component and a collecting bag 6. An opening is provided in the housing 51. The packaging component includes a first sliding rod 84, a second sliding rod 85 and a hot melt cutting member 9, the first sliding rod 84 and the second sliding rod 85 are set at an angle, the first sliding rod 84 and the second sliding rod 85 are slidably disposed on the housing 51 separately, the first sliding rod 84 and the second sliding rod 85 are capable of simultaneously sliding towards the hot melt cutting member 9 or simultaneously sliding away from the hot melt cutting member 9, and the hot melt cutting member 9 is securely connected to the housing 51. The collecting bag 6 passes through the opening and is connected to the housing 51, the collecting bag 6 is capable of being abutted by the first sliding rod 84, the second sliding rod 85 and the hot melt cutting member 9, and the hot melt cutting member 9 is configured to seal and cut the collecting bag 6.

In an embodiment, the first sliding rod 84 and the second sliding rod 85 gradually contract the collecting bag 6 while simultaneously sliding towards the hot melt cutting member 9 until the collecting bag 6 is pressed onto the hot melt cutting member 9. The hot melt cutting member 9 heats the collecting bag 6, and under the pressure of the first sliding rod 84 and the second sliding rod 85, the collecting bag 6 is sealed by hot melt so that emission of odor is avoided. Simultaneously, the hot melt cutting member 9 cuts the sealed collecting bag 6 to separate the collecting bag 6 from a new collecting bag 6. In this manner, reliable sealing of the collecting bag 6 is ensured, and thus the user does not need to directly seal the garbage bag, which improves the user experience while also avoiding the problem of odor escaping caused by poor sealing.

In an embodiment, the hot melt cutting member 9 includes a heating element and a cutting element. The heating element heats the collecting bag 6 and, under pressure of the first sliding rod 84 and the second sliding rod 85, achieves hot melt sealing of the collecting bag 6. The cutting element cuts the collecting bag 6 subjected to hot melt sealing so that the sealed collecting bag 6 falls off. In the embodiment, the heating element and the cutting element in the embodiment may be integrated. For example, the cutting element is disposed along the length direction of the heating element, and the cutting element is disposed at the middle position of the heating element. A tip or a cutting edge is provided on the cutting element. During the hot melt process of the heating element on the collecting bag 6, the stress is concentrated on the tip or the cutting edge of the cutting element, and the collecting bag 6 subjected to hot melt is separated under the action of the cutting element.

In an embodiment, as shown in FIG. 2 to FIG. 3, the packaging component further includes a packaging motor 81, first pulleys, a first timing belt 822, second pulleys and a second timing belt 832. The packaging motor 81 is securely connected to the housing 51. The first pulleys and the second pulleys are distributed along the length direction of a motor shaft of the packaging motor 81 and are securely connected to the motor shaft of the packaging motor 81 separately. The first timing belt 822 meshes with the first pulleys, and the second timing belt 832 meshes with the second pulleys. The first timing belt 822 and the second timing belt 832 are disposed at an angle. In the embodiment, the first timing belt 822 and the second timing belt 832 are perpendicular to each other. The first timing belt 822 is driven by the first pulleys, and the second timing belt 832 is driven by the second pulleys. An end of the first timing belt 822 and an end of the second timing belt 832 which are away from the packaging motor 81 are also connected to a first pulley and a second pulley respectively so that the first timing belt 822 and the second timing belt 832 can operate reliably. The first sliding rod 84 is in transmission connection with the first timing belt 822 and the second sliding rod 85 is in transmission connection with the second timing belt 832.

In an embodiment, a first drive block 841 is disposed on the first sliding rod 84, and a second drive block 851 is disposed on the second sliding rod 85. The first drive block 841 is securely connected to the first timing belt 822, and the second drive block 851 is securely connected to the second timing belt 832. In an embodiment, the first drive block 841 engages with the first timing belt 822, and the second drive block 851 engages with the second timing belt 832.

In the embodiment, the hot melt cutting member 9 is disposed at one corner of the opening of the housing 51, the packaging motor 81 is disposed at a corner of the housing 51 corresponding to the hot melt cutting member 9, and the packaging motor 81 is arranged in the vertical direction. Therefore, the first pulleys and the second pulleys are also arranged in the vertical direction, and the axis direction of the first pulleys and the axis direction of the second pulleys are the horizontal direction. Correspondingly, belt teeth of the first timing belt 822 and belt teeth of the second timing belt 832 are arranged in the horizontal direction. To ensure that the first sliding rod 84 and the second sliding rod 85 can simultaneously move towards or away from the hot melt cutting member 9, in the embodiment, the first drive block 841 of the first sliding rod 84 is securely connected to a side of the first timing belt 822 close to the collecting bag 6, and the second drive block 851 of the second sliding rod 85 is securely connected to a side of the second timing belt 832 away from the collecting bag 6. The perspective in FIG. 2 is taken as an example. The packaging motor 81 rotates clockwise, driving the first pulleys and the second pulleys to rotate clockwise, and thereby driving the first timing belt 822 and the second timing belt 832 to rotate clockwise. Correspondingly, the side of the first timing belt 822 close to the collecting bag 6 moves towards the hot melt cutting member 9, and the side of the second timing belt 832 away from the collecting bag 6 moves towards the hot melt cutting member 9. Therefore, simultaneous movement of the first sliding rod 84 and the second sliding rod 85 towards the hot melt cutting member 9 is achieved. In the perspective of FIG. 2, counterclockwise rotation of the packaging motor 81 can achieve simultaneous movement of the first sliding rod 84 and the second sliding rod 85 away from the hot melt cutting member 9. In other embodiments, the first drive block 841 of the first sliding rod 84 may be securely connected to a side of the first timing belt 822 away from the collecting bag 6, the second drive block 851 of the second sliding rod 85 may be securely connected to a side of the second timing belt 832 away from the collecting bag 6, and then the rotation direction of the packaging motor 81 is correspondingly adjusted. In this manner, simultaneous movement of the first sliding rod 84 and the second sliding rod 85 towards or away from the hot melt cutting member 9 can also be achieved. The relevant implementation principles have been described in detail in the previous text and are the same as principles in the previous text, which are not repeated here.

In an embodiment, the packaging component further provided with a motor case 811, a first pulley case 821 and a second pulley case 831. The packaging motor 81 and the first pulleys and the second pulleys which are securely disposed on the motor shaft are separately disposed within the motor case 811, and a first end of the first timing belt 822 and a first end of the second timing belt 832 pass through the motor case 811. The first pulley on a second end of the first timing belt 822 is disposed within the first pulley case 821, and the second end of the first timing belt 822 passes through the first pulley case 821. The second pulley on a second end of the second timing belt 832 is disposed within the second pulley case 831, and the second end of the second timing belt 832 passes through the second pulley case 831. To ensure the accuracy of the movement of the first sliding rod 84 and the second sliding rod 85, a first guide support shaft 823 is securely connected between the motor case 811 and the first pulley case 821, and a second guide support shaft 833 is securely connected between the motor case 811 and the second pulley case 831. The first drive block 841 is sleeved on the first guide support shaft 823 and slidably connected to the first guide support shaft 823, and the second drive block 851 is sleeved on the second guide support shaft 833 and slidably connected to the second guide support shaft 833. The first guide support shaft 823 is parallel to the movement direction of the first drive block 841, and the second guide support shaft 833 is parallel to the movement direction of the second drive block 851.

In an embodiment, to ensure the transmission accuracy, the first sliding rod 84 and the second sliding rod 85 are disposed perpendicular to each other. The first timing belt 822 and the first sliding rod 84 are disposed perpendicular to each other, and the second timing belt 832 and the second sliding rod 85 are disposed perpendicular to each other. The first drive block 841 is disposed on a first end of the first sliding rod 84 and slidably connected to the first guide support shaft 823, and the second drive block 851 is disposed on a first end of the second sliding shaft 85 and slidably connected to the second guide support shaft 833. Due to the sufficient support provided by the first guide support shaft 823 for the first drive block 841 and the first sliding rod 84, a second end of the first sliding rod 84 where no first drive block 841 is disposed may be suspended or slidably connected to the housing 51 to further strengthen the support. Those skilled in the art can make selection as needed, and the specific structure is not limited here. Due to the sufficient support provided by the second guide support shaft 833 for the second drive block 851 and the second sliding rod 85, a second end of the second sliding rod 85 where no second drive block 851 is disposed may be suspended or slidably connected to the housing 51 to further strengthen the support. The specific structure of the second sliding rod 85 and the second drive block 851 is not limited here.

In an embodiment, when the first sliding rod 84 and the second sliding rod 85 simultaneously move towards or away from the hot melt cutting member 9, the first sliding rod 84 and the second sliding rod 85 are driven by the first pulleys and the second pulleys respectively, and the rotational speed of the first pulleys and the rotational speed of the second pulleys are the same. Considering different stroke lengths of the first sliding rod 84 and the second sliding rod 85, to ensure that the first sliding rod 84 and the second sliding rod 85 can simultaneously abut against the hot melt cutting member 9, the number of teeth of the first pulley and the number of the second pulley can be determined according to the stroke of the first sliding rod 84 and the stroke of the second sliding rod 85. For ease of understanding, specific numerical values are substituted into the embodiment for analysis but cannot be considered as limitations on specific numerical values. It is set that the stroke of the second sliding rod 85 is twice the stroke of the first sliding rod 84. If the stroke of the first sliding rod 84 is a, then the stroke of the second sliding rod 85 is $2a$. Since the first pulleys and the second pulleys are securely connected to the motor shaft respectively, the rotational speed of the first pulleys and the rotational speed of the second pulleys are equal. The pulley teeth of the first pulleys mesh with the first timing belt 822, and the pulley teeth of the second pulleys mesh with the second timing belt 832. Therefore, the number of pulley teeth of the second pulley is twice the number of pulley teeth of the first pulley. In this manner, under the premise that the number of teeth of the first timing belt 822 and the number of teeth of the second timing belt 832 are the same, the motor shaft can rotate by a preset angle, and the distance traveled by the second timing belt 832 is twice the distance traveled by the first timing belt 822. Therefore, it is ensured that the first sliding rod 84 and the second sliding rod 85 can simultaneously abut against the hot melt cutting member 9 in different strokes.

In an embodiment, the excrement collecting box further includes a collecting box 52. The collecting box 52 is disposed under the housing 51 and detachably connected to the housing 51. An inner side wall of the collecting box 52, a bottom wall of the housing 51 and the bottom wall of the outer side of the collecting bag 6 collectively form a negative pressure space. A negative pressure device 53 is securely connected to the collecting box 52, and the negative pressure device 53 is configured to apply negative pressure to the negative pressure space. After the hot melt cutting member 9 performs hot melt cutting on the collecting bag 6, hot melt sealing is performed on the collecting bag 6 at the position of the hot melt cutting member 9. After being hot melt cut, a part of the hot melt sealed collecting bag 6 falls off with being cut, and the other part of the hot melt sealed collecting bag 6 serves as the bottom of a new collecting bag 6. After the negative pressure device 53 applies negative pressure, the new collecting bag 6 expands towards the inner side wall of the collecting box 52 due to the effect of the atmospheric pressure, and thus the arrangement of the new collecting bag 6 is completed. The negative pressure device 53 in the embodiment is a fan, and the blowing direction of the fan is facing the outside of the collecting box 52.

In an embodiment, a sealing position sensor 73 and a standby position sensor 74 are disposed on the housing 51. The packaging component has a sealing state and a standby state. When the packaging component is in the sealing state, the collecting bag 6 is abutted by the first sliding rod 84, the second sliding rod 85 and the hot melt cutting member 9, and at least part of the first sliding rod 84 coincides with the sealing position sensor 73. When the packaging component is in the standby state, at least part of the first sliding rod 84 coincides with the standby position sensor 74.

In an embodiment, the sealing position sensor 73 and the standby position sensor 74 in the embodiment may be Hall sensors, proximity switches or infrared sensors. In the embodiment, the sealing position sensor 73 and the standby position sensor 74 are Hall position sensors. In other embodiments, an opened position sensor 71 and a closed position sensor 72 may also be set as different types of sensors. For example, the opened position sensor 71 is set as a Hall sensor and the closed position sensor 72 is set as a proximity switch. The specific arrangement will not be exhaustive here. In the embodiment, to further enhance the sensitivity of the sealing position Hall sensor and the standby position Hall sensor, a second magnet 842 is disposed on the first sliding rod 84. When the packaging component is in the sealing state, the second magnet 842 is located above the sealing position Hall sensor. When the packaging component is in the standby state, the second magnet 842 is located above the standby position Hall sensor. The sealing position Hall sensor and the standby position Hall sensor are separately in communication connection with a processor, and the processor is securely connected to the housing 51.

In an embodiment, a detection sensor and a prompt device may also be disposed in the collecting box 52, and the detection sensor is in communication connection with the processor. After the cut collecting bag 6 falls into the collecting box 52, and the detection sensor detects that the collecting bag 6 falls into the collecting box 52. If the cut collecting bag 6 cannot be removed from the collecting box 52, the new collecting bag 6 may not be able to be unfolded or the unfolding effect may not be ideal. Whether an unremoved collecting bag 6 exists in the collecting box 52 may be acquired through the detection sensor. After it is determined that no unremoved collecting bag 6 exists in the collecting box 52, the negative pressure device 53 is opened to unfold a new collecting bag 6. The detection sensor may be any type of sensor with the detection function, such as an infrared sensor, a proximity switch, an acceleration sensor or a weight sensor. The detection sensor may be disposed at any position within the collecting box 52 according to the function of the detection sensor and detection principles, and multiple detection sensors may be set according to actual requirements to enhance the detection accuracy. For example, when weight sensors are used, multiple weight sensors may be evenly arranged at the bottom of the collecting box 52. When one or more weight sensors sense that the change amplitude of the weight reaches a preset value, it is indicated that the collecting bag 6 has fallen into the collecting box 52. At this time, the processor controls the prompt device in communication connection with the processor to prompt the user to take out the collecting bag 6 in time. At this time, the user may take down the collecting box 52 and take out the packaged collecting bag 6 from the collecting box 52, and then reconnect the collecting box 52 to the housing 51. For ease of operation, a buckle may be used between the collecting box 52 and the housing 51 for achieving detachable connection. The prompt device may be one or both of a warning light and a horn and is controlled by the processor for prompting, which is not repeated here. After the detection sensor detects that the collecting bag 6 is removed, the processor controls the fan to exhaust. Under the action of the atmospheric pressure, the new collecting bag 6 is sucked in and unfolded.

In the embodiment, the processor may be a centralized or distributed controller. For example, the controller may be an independent single-chip microcomputer or may be composed of multiple distributed single-chip microcomputers. The single-chip microcomputer can run control programs and control multiple components to achieve their functions.

In an embodiment, as shown in FIG. 4 to FIG. 11, the excrement collecting box further includes a sealing component and a detection unit, where the sealing component includes a left side sealing portion 11 and a right side sealing portion 21, at least one of the left side sealing portion 11 and the right side sealing portion 21 is capable of sliding relative to the housing 51, the left side sealing portion 11 is configured to be capable of being closed with the right side sealing portion 21, the collecting bag 6 is connected to the housing 51, an outer side wall of the collecting bag 6 is capable of being abutted by the sealing component, the detection unit is rotatably disposed on at least one of the left side sealing portion 11 and the right side sealing portion 21, the detection unit is capable of rotating towards a bottom wall of the collecting bag 6, and when the collecting bag is filled up, the detection unit can abut against the pet excrement. After the left side sealing portion 11 abuts against the right side sealing portion 21, the collecting bag 6 is sealed by the sealing component so that emission odor is prevented. During the process of the sealing component sealing the collecting bag 6, whether the collecting bag 6 is filled up may be determined according to the state of the detection unit. When the collecting bag 6 is not filled up, the detection unit can rotate normally towards the bottom wall of the collecting bag 6 until the collecting bag 6 is sealed. When the collecting bag 6 is filled up, the detection unit cannot rotate towards the bottom wall of the collecting bag 6 or the rotation of the collecting bag 6 is blocked, The user can replace the collecting bag 6 according to the state of the detection unit, which can save the collecting bag 6 and reduce the cleaning frequency of the user, while also preventing the emission of odor. After it is detected that the collecting bag 6 is filled up, the packaging component performs hot melt sealing and cutting on the full collecting bag 6 and unfolds a new collecting bag 6 to reduce operations by the user.

In an embodiment, the left side sealing portion 11 and the right side sealing portion 21 can approach or move away relative to each other. The detection unit is rotatably disposed on at least one of the left side sealing portion 11 and the right side sealing portion 21. In the embodiment, the left side sealing portion 11 and the right side sealing portion 21 are provided with a detection unit respectively, and the detection units are rotatably disposed on the left side sealing portion 11 and the right side sealing portion 21. The detection unit includes a left side rotation shaft 112, a left side detection member 12, a right side rotation shaft 212 and a right side detection member 22. The left side detection member 12 is rotatably connected to the left side sealing portion 11 through the left side rotation shaft 112, and the right side detection member 22 is rotatably connected to the right side sealing portion 21 through the right side rotation shaft 212. During the relative approaching process between the left side sealing portion 11 and the right side sealing portion 21, the left side detection member 12 and the right side detection member 22 separately slide relative to the housing 51, and the lengths of the left side detection member 12 and the right side detection member 22 extending beyond the housing 51 are increased. During the relative moving away process between the left side sealing portion 11 and the right side sealing portion 21, the left side detection member 12 and the right side detection member 22 separately slide relative to the housing 51, and lengths of the left side detection member 12 and the right side detection member 22 extending beyond the housing 51 are decreased. Limit members are disposed on the left side sealing portion 11 and the right side sealing portion 21 respectively to prevent the left side sealing portion 11 and the right side sealing portion 21 from crossing a closed position during the relative approaching process. In other embodiments, limit members may be set according to the actual engineering situation to limit positions of components and parts, and the specific structure is not specifically limited here.

In an embodiment, when the left side sealing portion 11 and the right side sealing portion 21 approach relative to each other, the left side detection member 12 and the right side detection member 22 can separately rotate towards the bottom wall of the collecting bag 6. When the left side sealing portion 11 and the right side sealing portion 21 approach relative to each other, the lengths of the left side detection member 12 and the right side detection member 22 extending beyond the housing 51 are increased, and the left side detection member 12 and the right side detection member 22 can rotate towards the bottom wall of the collecting bag 6 under the action of gravity of the left side detection member 12 and the right side detection member 22 or through a torsion spring added on the rotation shafts. When the left side sealing portion 11 and the right side sealing portion 21 move away relative to each other, the lengths of the left side detection member 12 and the right side detection member 22 extending beyond the housing 51 are decreased, and the left side detection member 12 and the right side detection member 22 separately rotate towards the direction opposite to the bottom wall of the collecting bag 6 under the reactive force of the housing 51.

In an embodiment, when the excrement collecting box is not filled up, the left side detection member 12 and the right side detection member 22 can normally rotate towards the bottom wall direction of the collecting bag 6, and the left side sealing portion 11 and the right side sealing member 21 can be closed normally, with the closed position located at the middle position between the left side detection member 12 and the right side detection member 22. In actual using scenarios, when the collecting box is filled up, the heights of accumulated pet excrement at different positions of the collecting bag 6 are uneven, which may cause that the rotation of one of the left side detection member 12 and the right side detection member 22 towards the bottom wall of collecting bag 6 is blocked while the other of the left side detection member 12 and the right side detection member 22 can rotate normally. At this time, one of the left side sealing portion 11 and the right side sealing portion 21 cannot continue to move or the movement speed is reduced, while the other of the left side sealing portion 11 and the right side sealing portion 21 can move normally. The setting of the limit member on the left side sealing portion 11 and the right side sealing portion 21 ensures that when the preceding situation occurs, the left side sealing portion 11 or the right side sealing portion 21 can stop after reaching the closed position without crossing the closed position. In this manner, whether the collecting bag 6 is full is easy to determine, seal failure can be avoided, and thus odor emission is prevented.

In an embodiment, when collecting bags 6 in different specifications are used for collection, heights of excrement that the collecting bags 6 can store are different. In view of this, different length dimensions may be set for the left side detection member 12 and the right side detection member 22 for effectively detecting whether the collecting bag 6 is filled up. When the height of excrement that the collecting bag 6 can store is relatively high, the lengths of the left side detection member 12 and the right side detection member 22 are decreased so that maximum utilization of the space inside the collecting bag 6 can be achieved. Conversely, when the height of excrement stored in the collecting bag 6 is relatively low, the lengths of the left side detection member 12 and the right side detection member 22 are increased to avoid the situation where the collecting bag 6 cannot be sealed and packaged smoothly.

In an embodiment, the left side sealing portion 11 and the right side sealing portion 21 are driven by a drive transmission component. The drive transmission component is securely disposed on the housing 51. The drive transmission component includes a drive unit 31, an intermediate gear 32 and a transmission unit. The drive unit 31 is securely connected to the housing 51. The drive unit 31 may be a servo motor or a stepper motor, or in other embodiments, may be a servo motor. The drive unit 31 is provided with a drive gear shaft 311, the drive gear shaft 311 meshes with the intermediate gear 32, and the intermediate gear 32 is sleeved on an output shaft 33. In an embodiment, the connection manner between the intermediate gear 32 and the output shaft 33 is key joint, and the output shaft 33 is rotatably connected to the housing 51. At least one end of the output shaft 33 is connected to the transmission unit.

Figure 4:
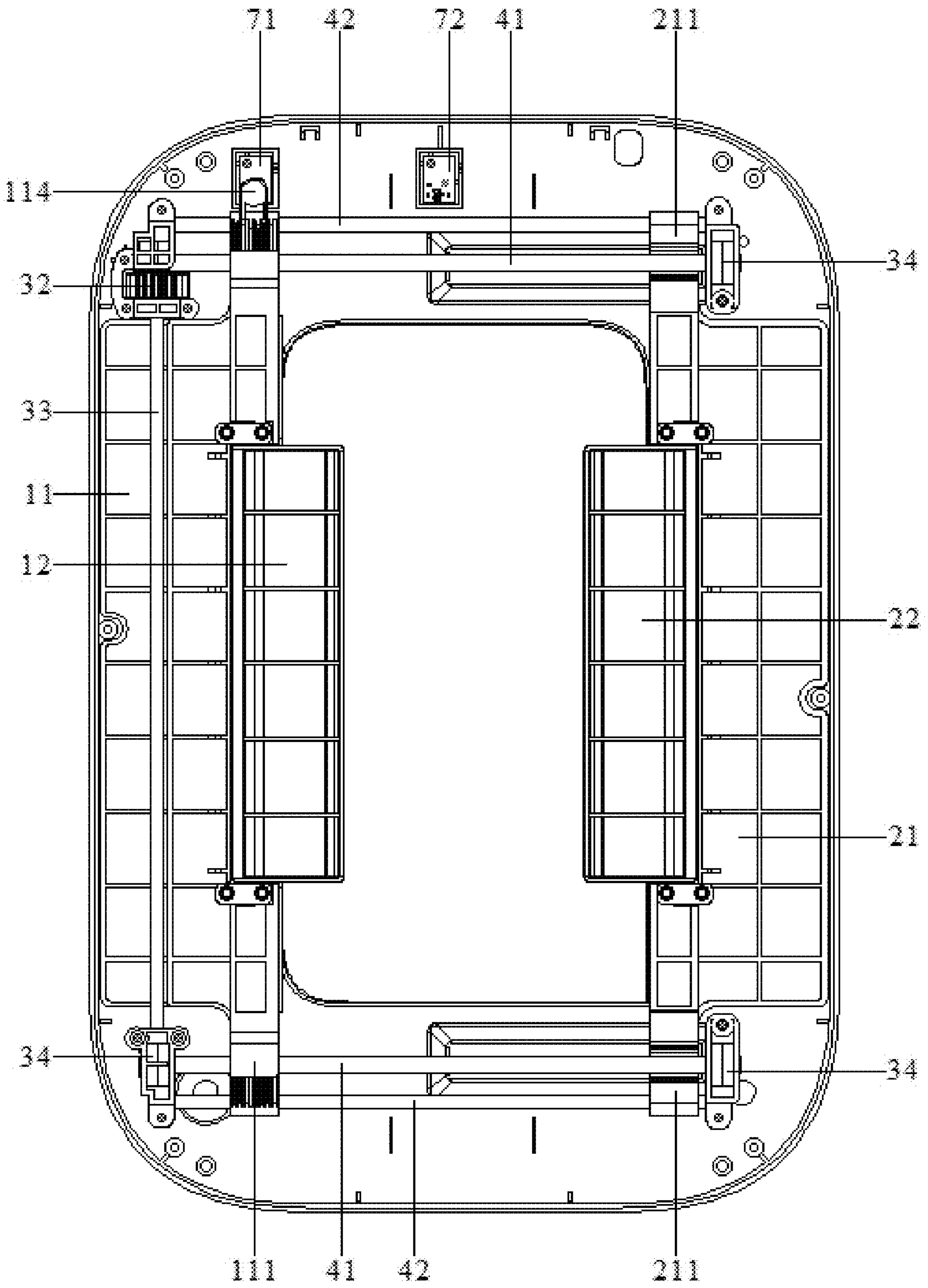
FIG. 4 is a structural view of an excrement collecting box of which a sealing component is in an opened state where a housing of the excrement collecting box is hidden according to an embodiment of the present application.

In an embodiment, as shown in FIG. 4, the transmission unit includes third pulleys 34 and third timing belts 41. The third pulleys 34 are sleeved on the output shaft 33. In an embodiment, the connection manner between the third pulleys 34 and the output shaft 33 is key joint. The third timing belts 41 mesh with the third pulleys 34. Left side drive blocks 111 are disposed on end portions of the left side sealing portion 11, and right side drive blocks 211 are disposed on end portions of the right side sealing portion 21. The left side drive blocks 111 and the right side drive blocks 211 are securely connected to the third timing belts 41 respectively. To enable the left side sealing portion 11 and the right side sealing portion 21 to approach or move away relative to each other, in the embodiment, the left side drive blocks 111 are securely connected to the upper surface of the third timing belts 41, and simultaneously, the right side drive blocks 211 are securely connected to the lower surface of the third timing belts 41. When the third timing belts 41 rotate along the clockwise direction, the left side drive blocks 111 and the right side drive blocks 211 approach or move away relative to each other, thereby driving the left side sealing portion 11 and the right side sealing portion 21 to approach or move away relative to each other. When the third timing belts 41 rotate along the counterclockwise direction, the left side drive blocks 111 and the right side drive blocks 211 move away or approach relative to each other, thereby driving the left side sealing portion 11 and the right side sealing portion 21 to move away or approach relative to each other.

In other embodiments of the present application, the left side drive blocks 111 may be securely connected to the lower surface of the third timing belts 41, and simultaneously, the right side drive blocks 211 may be securely connected to the upper surface of the third timing belts 41. In this manner, it also can be achieved that the left side drive blocks 111 and the right side drive blocks 211 approach or move away relative to each other. The specific implementation principles have been described in detail in the previous text, which are not repeated here.

In an embodiment, to achieve the better connection effect, in the embodiment, the left side drive block 111 and the right side drive block 211 are separately provided with an engaging portion and a limit portion, and the engaging portion is securely connected to the limit portion. The engaging portion is provided with engaging teeth. The engaging teeth of the engaging portion engage with the belt teeth of the third timing belt 41, and the belt teeth of the third timing belt 41 drive the engaging portion to move. The limit portion is disposed on the outer side of the third timing belt 41 and is configured to prevent the third timing belt 41 from jumping during the transmission process. The setting of the limit portion avoids the problem that the third timing belt 41 jumping during the transmission process, causing the belt teeth to detach from the engaging portion and resulting in transmission failure.

In an embodiment, to avoid relative displacement between the left side drive blocks 111 and the right side drive blocks 211 during relative approaching or moving away process, the transmission unit further includes third guide support shafts 42, and the third guide support shafts 42 are securely disposed on the housing 51. The third guide support shafts 42 are parallel to the movement direction of the left side drive blocks 111 and the movement direction of the right side drive blocks 211. The left side drive blocks 111 and the right side drive blocks 211 are sleeved on the third guide support shafts 42 and slidably connected to the third guide support shafts 42 respectively.

Figure 5:
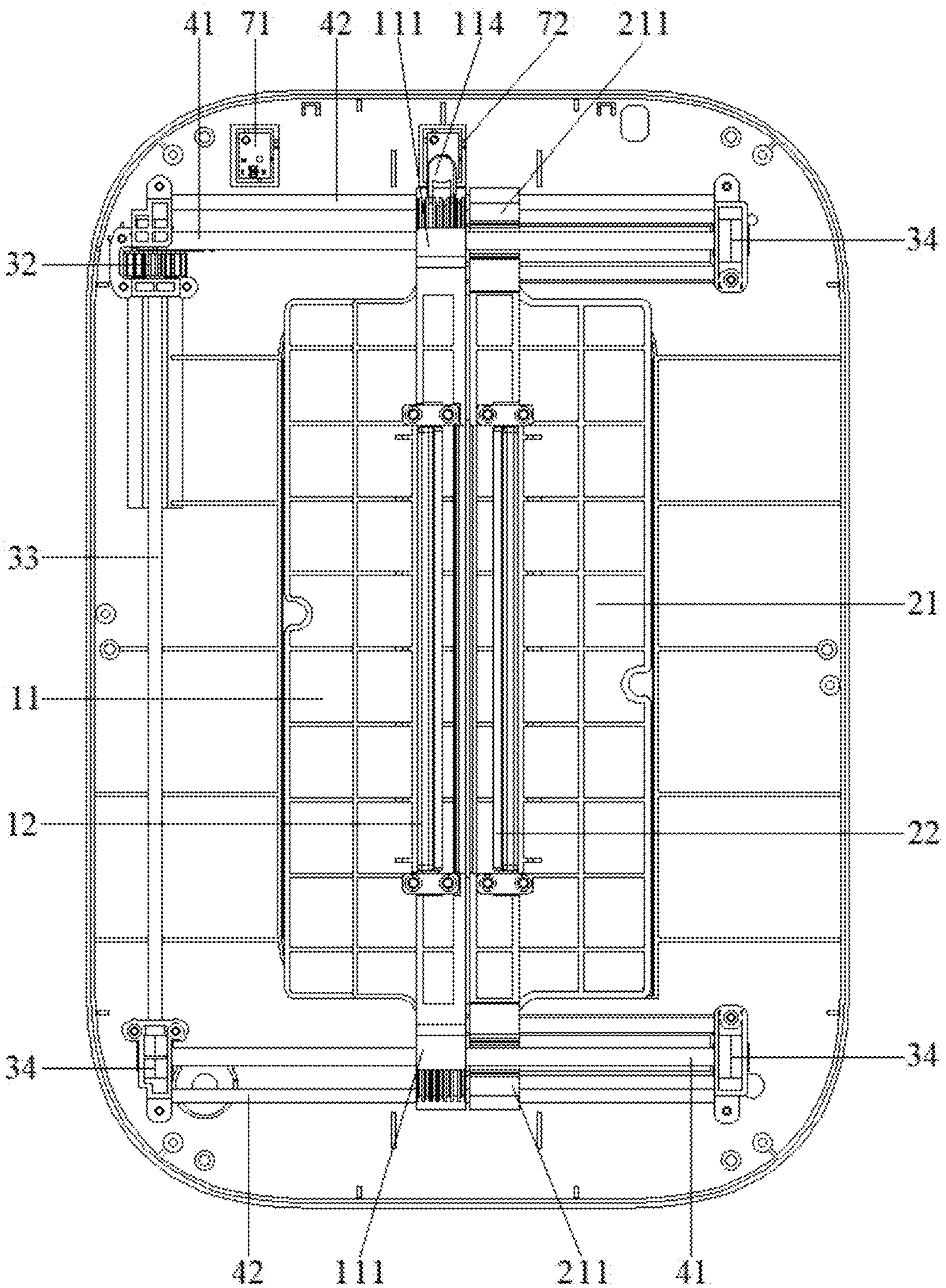
FIG. 5 is a structural view of a sealing component in a closed state according to an embodiment of the present application.
Figure 6:
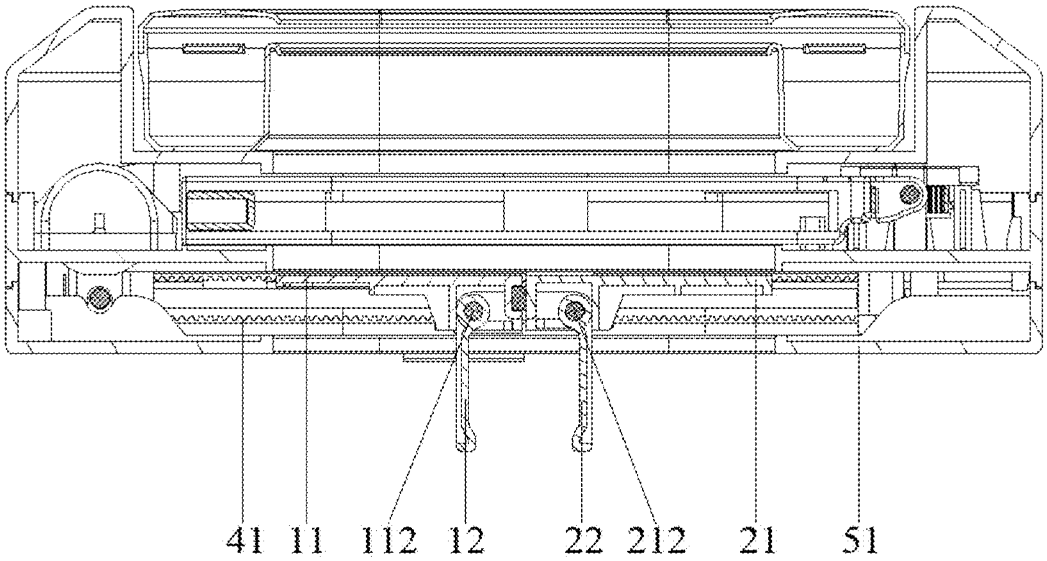
FIG. 6 is a side sectional view of a sealing component in a closed state according to an embodiment of the present application.
Figure 7:
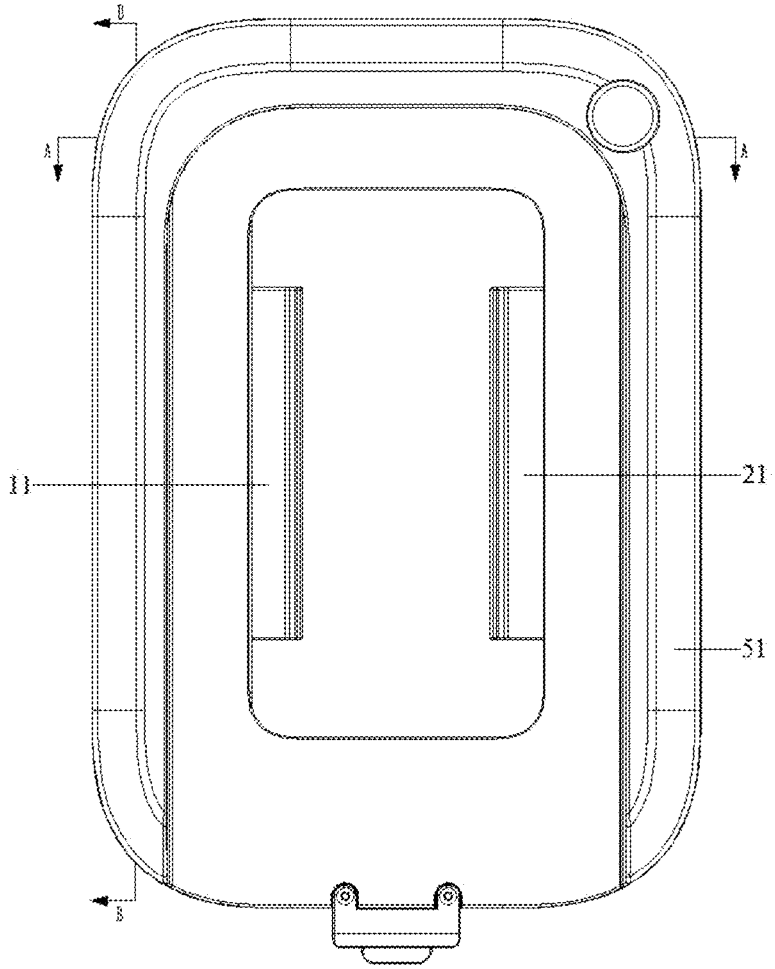
FIG. 7 is a structural view of an excrement collecting box of which a sealing component is in an opened state according to an embodiment of the present application.
Figure 8:
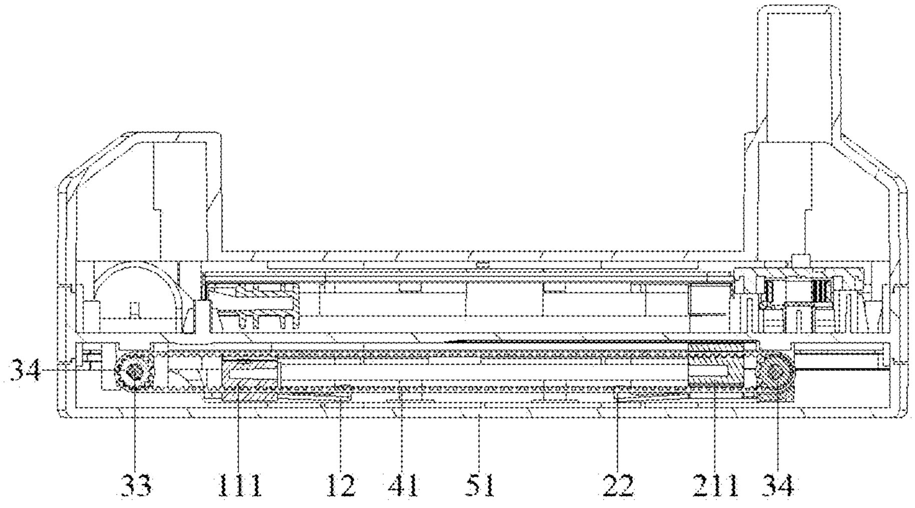
FIG. 8 is a sectional view of part A-A in FIG. 7.
Figure 9:
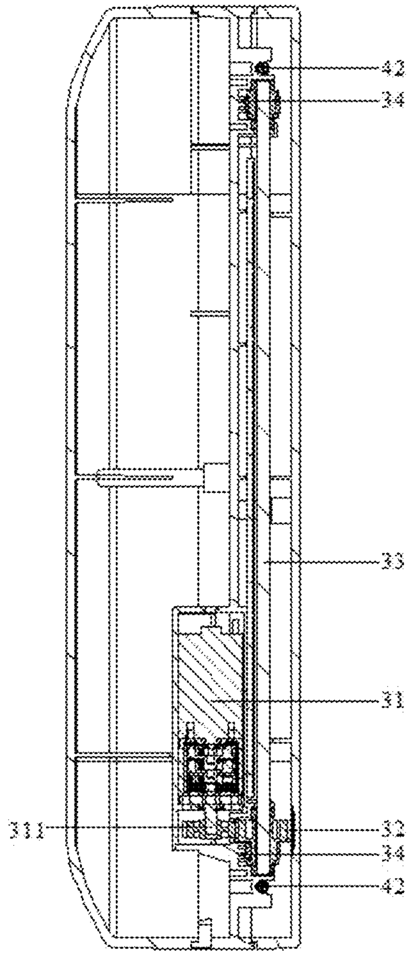
FIG. 9 is a sectional view of part B-B in FIG. 7.
Figure 10:
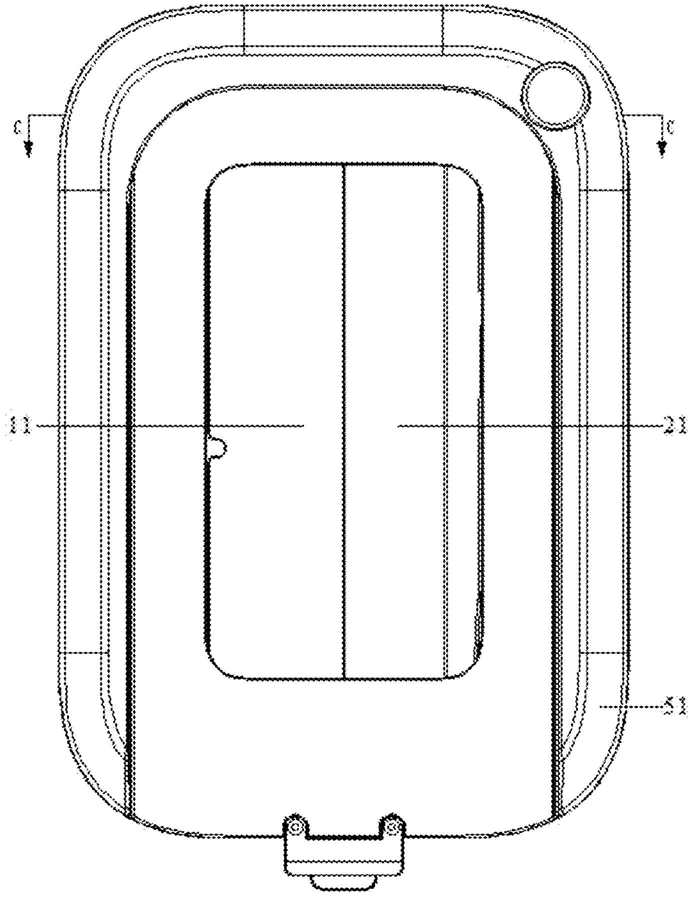
FIG. 10 is a structural view of an excrement collecting box of which a sealing component is in a closed state according to an embodiment of the present application.
Figure 11:
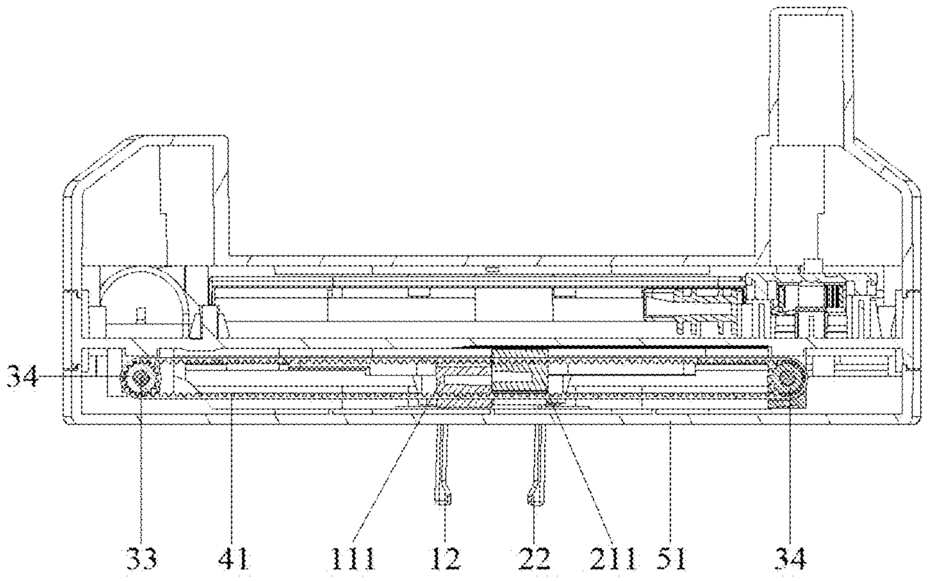
FIG. 11 is a sectional view of part C-C in FIG. 10.

In an embodiment, as shown in FIG. 4 to FIG. 5, to ensure that the left side sealing portion 11 and the right side sealing portion 21 are evenly loaded, two transmission units are provided in the embodiment, and the two transmission units are in transmission connection with two ends of the output shaft 33 respectively. Correspondingly, two left side drive blocks 111 and two right side drive blocks 211 are provided. The two left side drive blocks 111 are located at two ends of the left side sealing portion 11 respectively, and the two right side drive blocks 211 are located at two ends of the right side sealing portion 21 respectively. The embodiment has provided a detailed description of the connection relationship between the output shaft 33 and the transmission unit, the composition of the transmission unit and the connection relationship between the transmission unit and the left drive blocks 111, the connection relationship between the transmission unit and the right drive blocks 211, and specific analysis is conducted on how to achieve relative approaching or moving away between the left side drive blocks 111 and the right side drive blocks 211, so the preceding content will not be repeated here. The setting of the output shaft 33, the third pulleys 34 and the third timing belts 41 can ensure the consistency of the movement of two ends of the output shaft 33, and thereby ensuring the movement reliability during the relative approaching or moving away process between the left side sealing portion 11 and the right side sealing portion 21.

In an embodiment, as shown in FIG. 1, to enhance the sealing effect of the sealing component on the collecting bag 6, a sealing strip 113 is disposed on the left side sealing portion 11 or the right side sealing portion 21. In the embodiment, the sealing strip 113 is disposed on a side of the left side sealing portion 11 facing the right side sealing portion 21. In other embodiments, the sealing strip 113 may also be disposed on a side of the right side sealing portion 21 facing the left side sealing portion 11. When the left side sealing portion 11 abuts against the right side sealing portion 21, the sealing strip 113 abuts against the outer side wall of the collecting bag 6. When the left side sealing portion 11 abuts against the right side sealing portion 21, creep occurs on the sealing strip 113, ensuring the sealing effect of the sealing component on the collecting bag 6. Other manners may also be used for enhancing the sealing effect of the sealing component on the collecting bag 6. For example, a protrusion is provided on a side of one of the left side sealing portion 11 and the right side sealing portion 21 facing the other of the left side sealing portion 11 and the right side sealing portion 21. Correspondingly, a groove is provided on the other of the left side sealing portion 11 and the right side sealing portion 21 for matching the protrusion. When the left side sealing portion 11 abuts against the right side sealing portion 21, the protrusion matches the groove, and the sealing effect on the collecting bag 6 is strengthened according to the principle of labyrinth seal.

In an embodiment, as shown in FIG. 4 to FIG. 5, to facilitate the user to conveniently determine whether the excrement collecting box is full, an opened position sensor 71 and a closed position sensor 72 are further disposed on the housing 51, and the sealing component has an opened state and a closed state. When the sealing component is in the opened state, at least part of the sealing component coincides with the opened position sensor 71. When the sealing component is in the closed state, the left side sealing portion 11 abuts against the right side sealing portion 21, and at least part of the sealing component coincides with the closed position sensor 72. When the excrement collecting box is full, the collecting bag 6 stores a large amount of pet excrement. During the process of the sealing component sealing the collecting bag 6, the left side detection member 12 and the right side detection member 22 cannot continue to rotate towards the bottom wall of the collecting bag 6 due to the impact of the pet excrement; as a result, the sealing component cannot seal the collecting bag 6, that is, at least part of the sealing component cannot coincide with the closed position sensor 72. In an embodiment, due to the particularity of the usage scenario, under certain specific conditions, even if the collecting bag 6 is full, the rotation of at least one of the left side detection member 12 and the right side detection member 22 towards the direction facing the bottom wall of the collecting bag 6 is blocked. However, at this time, the drive unit 31 is still driving the sealing component. Under the action of the driving force, at least one of the left side detection member 12 and the right side detection member 22 can squeeze the excrement and then continue to rotate towards the direction of the bottom wall of the collecting bag 6. That is, the sealing component can be in the closed state under the action of the driving force. It is to be understood that the sealing component also requires a longer time to turn to the closed state in this usage scenario. Therefore, whether the collecting bag 6 is full may be determined through a preset closing time. If the sealing component cannot turn to the closed state within a first preset time, it is indicated that the collecting bag 6 is full, and subsequent operations can be performed.

In the embodiment, the opened position sensor 71 and the closed position sensor 72 may be Hall sensors, proximity switches or infrared sensors. In the embodiment, the opened position sensor 71 and the closed position sensor 72 are Hall position sensors. In other embodiments, the opened position sensor 71 and the closed position sensor 72 may also be set as different types of sensors. For example, the opened position sensor 71 is set as a Hall sensor and the closed position sensor 72 is set as a proximity switch. The specific arrangement will not be exhaustive here. In the embodiment, to further enhance the sensitivity of the opened position Hall sensor and the closed position Hall sensor, a first magnet 114 is disposed on the left side sealing portion 11 or the right side sealing portion 21. When the sealing component is in the opened state, the first magnet 114 is located above the opened position Hall sensor. When the sealing component is in the closed state, the first magnet 114 is located above the closed position Hall sensor. The opened position Hall sensor and the closed position Hall sensor are in communication connection with the processor, and the processor is securely connected to the housing 51.

In an embodiment, during the process of the sealing component sealing the collecting bag 6, the drive unit 31 drives forward, the drive gear shaft 311 meshes with the intermediate gear 32, the intermediate gear 32 drives the output shaft 33 to rotate, the output shaft 33 drives the third pulleys 34 disposed on two ends of the output shaft 33 to rotate, and the third pulleys 34 drives the third timing belts 41 for transmission. The left side drive blocks 111 and the right side drive blocks 211 mesh with the lower surface and the upper surface of the third timing belts 41 respectively and drive the left side sealing portion 11 and the right side sealing portion 21 to approach relative to each other. At this time, if the collecting bag 6 is not full, the left side detection member 12 and the right side detection member 22 can rotate towards the direction of the bottom wall of the collecting bag 6, and the left side sealing portion 11 can be closed with the right side sealing portion 21. At this time, if the collecting bag 6 is full, the rotation of the left side detection member 12 and the right side detection member 22 towards the direction of the bottom wall of the collecting bag 6 is blocked, and the left side sealing portion 11 cannot be closed with the right side sealing portion 21; at this time, the collecting bag 6 is full. The processor controls the packaging motor 81 to operate, driving the first sliding rod 84 and the second sliding rod 85 to move towards the hot melt cutting member 9. When the first sliding rod 84 and the second sliding rod 85 separately abut against the hot melt cutting member 9, the second magnet 842 on the first sliding rod 84 is located above the sealing position Hall sensor.

The hot melt cutting member 9 performs hot melt sealing on the collecting bag 6. During this process, the packaging motor 81 continuously outputs power to ensure that the first sliding rod 84, the second sliding rod 85 and the hot melt cutting member 9 always abut against the collecting bag 6 during the hot melt sealing process, ensuring the effect of hot melt sealing. After a second preset time, the hot melt cutting member 9 stops heating, and at the same time, the packaging motor 81 drives the first sliding rod 84 and the second sliding rod 85 to move away from the hot melt cutting member 9. When the second magnet 842 on the first sliding rod 84 is located above the standby position Hall sensor, the packaging motor 81 stops, and the processor controls the prompt device in communication connection with the packaging motor 81 to prompt the user to remove the collecting bag 6 in time. The prompt device may be one or both of a warning light and a horn. Using the processor to control the prompt device for prompting is not repeated here. After the detection sensor detects that the collecting bag 6 is removed, the processor controls the fan to exhaust. Under the action of the atmospheric pressure, the new collecting bag 6 is sucked in and unfolded.

In the embodiment, the processor may be a centralized or distributed controller. For example, the controller may be an independent single-chip microcomputer or may be composed of multiple distributed single-chip microcomputers. The single-chip microcomputer can run control programs and control multiple components to achieve their functions.

Figure 14:
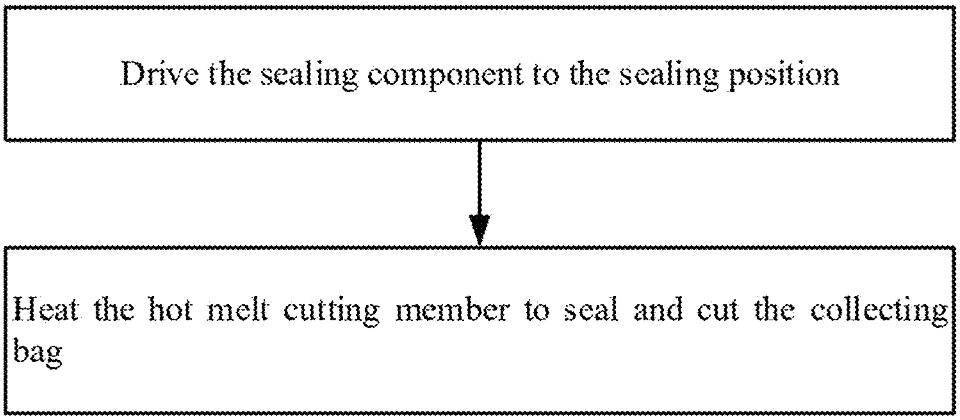
FIG. 14 is another flowchart of a using method of an excrement collecting box according to an embodiment of the present application.

As shown in FIG. 14, the embodiment provides a using method of an excrement collecting box. The using method is applied to the excrement collecting box provided in the embodiments of the present application.

Figure 12:
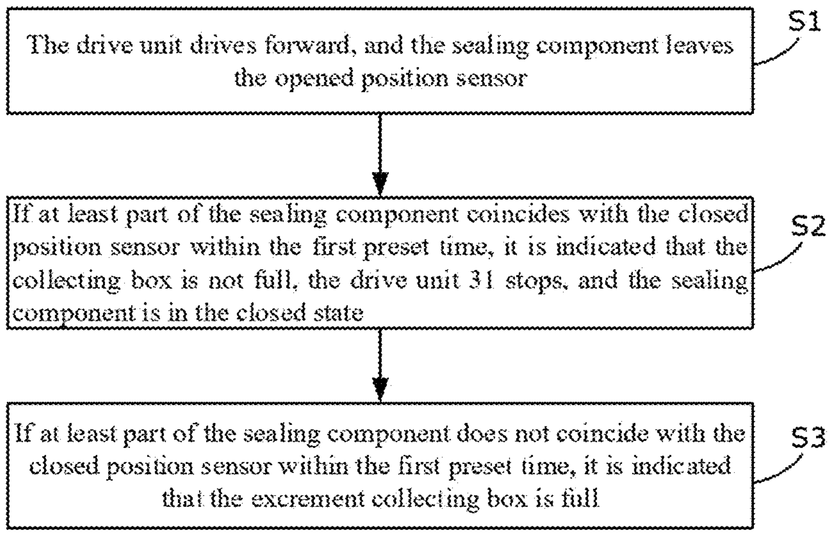
FIG. 12 is a flowchart of a using method of an excrement collecting box according to an embodiment of the present application.

As shown in FIG. 12, the fullness detection method includes steps described below.

In S1, the drive unit 31 drives forward, and the first magnet 114 located at at least part of the sealing component leaves the upper side of the opened position Hall sensor. The processor receives a leaving signal and drives the sealing component to move within the first preset time.

In S2, if the first magnet 114 located at at least part of the sealing component reaches the upper side of the closed position Hall sensor within the first preset time, and the processor receives an arrival signal within the first preset time, it is indicated that the collecting excrement box is not filled up, the processor controls the drive unit 31 to stop, and the sealing component is in the closed state.

In S3, if the sealing component does not reach the upper side of the closed position Hall sensor, that is, the closed position sensor 72, within the first preset time, and the processor does not receive the arrival signal within the first preset time, it is indicated that the collecting box is full.

Figure 13:
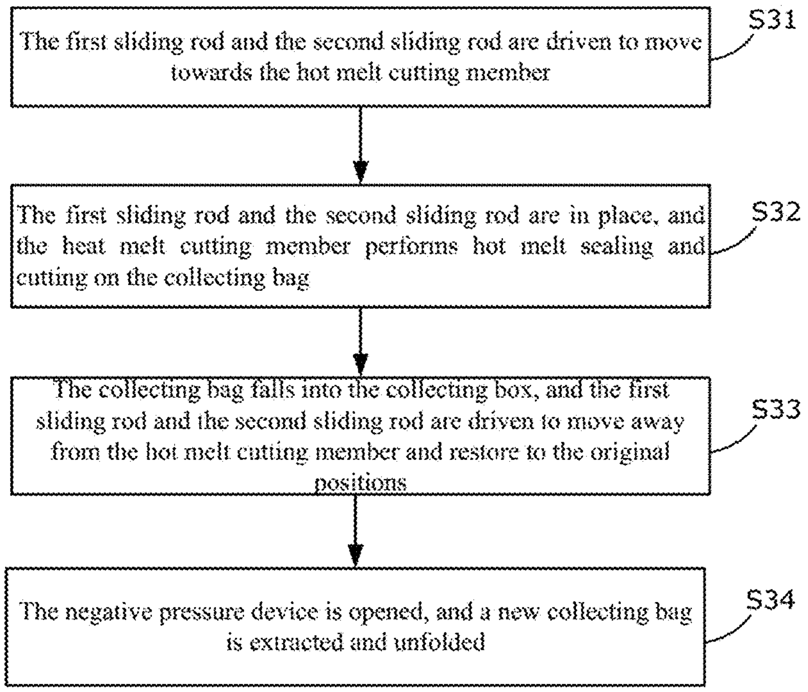
FIG. 13 is a flowchart of a using method of a packaging component according to an embodiment of the present application.

In an embodiment, when the excrement collecting box is filled up, the processor controls the drive unit 31 to back drive to enable the sealing component to return to the opened state, and then operations of packaging and sealing are performed subsequently. As shown in FIG. 13, the method of packaging and sealing operations includes steps described below.

In S31, the processor controls the packaging motor 81 to rotate forward, the packaging motor 81 drives the first sliding rod 84 and the second sliding rod 85 to move towards the hot melt cutting member 9.

In S32, the first sliding rod 84 and the second sliding rod 85 are in place, the second magnet 842 reaches the upper side of the sealing position Hall sensor, the sealing position Hall sensor collects a signal and transmits the signal to the processor, the processor starts to time, and the processor controls the heat melt cutting member 9 to perform hot melt sealing and cutting on the collecting bag 6; during this process, the packaging motor 81 continuously outputs power to the outside.

In S33, the collecting bag 6 falls into the collecting box 52, after the second preset time since the processor starts to time, the processor controls the packaging motor 81 to reversely rotate, the packaging motor 81 drives the first sliding rod 84 and the second sliding rod 85 to move away from the hot melt cutting member 9, the second magnet 842 reaches the upper side of the standby position Hall sensor, the standby position Hall sensor collects a signal and transmits the signal to the processor, and the processor controls the packaging motor 81 to stop.

In S34, the detection sensor detects whether the collecting bag 6 in the collecting box 52 is removed, and if the collecting bag 6 is not removed, the prompt device is started to prompt the user to remove the collecting bag 6 in time; if the collecting bag 6 is removed, the negative pressure device 53 is started, and thus a new collecting bag 6 is extracted and unfolded.

What is claimed is:

1. An excrement collecting box configured to collect pet excrement, comprising:

a housing, wherein an opening is provided in the housing;

a packaging component, wherein the packaging component comprises a first sliding rod, a second sliding rod and a hot melt cutting member, the first sliding rod and the second sliding rod are set at a preset angle, the first sliding rod and the second sliding rod are slidably disposed on the housing separately, the first sliding rod and the second sliding rod are capable of simultaneously sliding towards the hot melt cutting member or simultaneously sliding away from the hot melt cutting member, and the hot melt cutting member is securely connected to the housing; and a collecting bag, wherein the collecting bag passes through the opening and is connected to the housing, the collecting bag is capable of being abutted by the first sliding rod, the second sliding rod and the hot melt cutting member, and the hot melt cutting member is configured to seal and cut the collecting bag.

2. The excrement collecting box according to claim 1, wherein the packaging component further comprises:

a packaging motor, wherein the packaging motor is securely connected to the housing;

a first timing belt and two first pulleys, wherein the two first pulleys are disposed at two ends of the first timing belt respectively and mesh with the first timing belt, one first pulley of the two first pulleys is securely connected to a motor shaft of the packaging motor, the other first pulley of the two first pulleys is securely disposed on the housing, and the first sliding rod is securely connected to the first timing belt; and a second timing belt and two second pulleys, wherein the two second pulleys are disposed at two ends of the second timing belt respectively and mesh with the second timing belt, one second pulley of the two second pulleys is securely connected to the motor shaft of the packaging motor, the other second pulley of the two second pulleys is securely disposed on the housing, and the second sliding rod is securely connected to the second timing belt.

3. The excrement collecting box according to claim 2, wherein a first drive block is disposed on the first sliding rod, a second drive block is disposed on the second sliding rod, the first drive block is securely connected to a side of the first timing belt close to the collecting bag, and the second drive block is securely connected to a side of the second timing belt away from the collecting bag; or the first drive block is securely connected to a side of the first timing belt away from the collecting bag, and the second drive block is securely connected to a side of the second timing belt close to the collecting bag.

4. The excrement collecting box according to claim 3, wherein the packaging component further comprises a first guide support shaft and a second guide support shaft, the first drive block is slidably connected to the first guide support, the second drive block is slidably connected to the second guide support shaft, the first guide support shaft is parallel to a movement direction of the first drive block, and the second guide support shaft is parallel to a movement direction of the second drive block.

5. The excrement collecting box according to claim 4, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

6. The excrement collecting box according to claim 3, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

7. The excrement collecting box according to claim 2, wherein the first sliding rod and the second sliding rod are perpendicular to each other, the first timing belt and the first sliding rod are perpendicular to each other, and the second timing belt and the second sliding rod are perpendicular to each other.

8. The excrement collecting box according to claim 7, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

9. The excrement collecting box according to claim 2, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

10. The excrement collecting box according to claim 1, further comprising a collecting box, wherein the collecting box is disposed under the housing and detachably connected to the housing, an inner side wall of the collecting box, a bottom wall of the housing and a bottom wall of the collecting bag collectively form a negative pressure space, a negative pressure device is securely connected to the collecting box, and the negative pressure device is configured to apply negative pressure to the negative pressure space.

11. The excrement collecting box according to claim 10, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

12. The excrement collecting box according to claim 1, wherein a sealing position sensor and a standby position sensor are disposed on the housing, the packaging component has a sealing state and a standby state, the sealing position sensor is configured to detect whether the packaging component is in the sealing state, the standby position sensor is configured to detect whether the packaging component is in the standby state, and in a case where the packaging component is in the sealing state, the collecting bag is abutted by the first sliding rod, the second sliding rod and the hot melt cutting member.

13. The excrement collecting box according to claim 12, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

14. The excrement collecting box according to claim 1, further comprising a sealing component and a detection unit, wherein the sealing component comprises a left side sealing portion and a right side sealing portion, the left side sealing portion and the right side sealing portion are capable of sliding relative to the housing, the left side sealing portion is configured to be closed with the right side sealing portion, the collecting bag is capable of being abutted by the sealing component, the detection unit is rotatably disposed on the left side sealing portion and the right side sealing portion, and the detection unit is configured to, in a case where the collecting bag is full, abut against the pet excrement to prevent the detection unit from rotating towards the bottom wall of the collecting bag.

15. A method for using an excrement collecting box, the excrement collecting box comprising a housing, a packaging component and a collecting bag, the method comprising:

driving the packaging component to a sealing position; and heating a hot melt cutting member comprised in the packaging component to seal and cut the collecting bag;

wherein an opening is provided in the housing;

wherein the packaging component further comprises a first sliding rod and a second sliding rod, the first sliding rod and the second sliding rod are set a a preset angle, the first sliding rod and the second sliding rod are slidably disposed on the housing separately, the first sliding rod and the second sliding rod are capable of simultaneously sliding towards the hot melt cutting member or simultaneously sliding away from the hot melt cutting member, and the hot melt cutting member is securely connected to the housing housing;

wherein the collecting bag passes through the opening and is connected to the housing, the collecting bag is capable of being abutted by the first sliding rod, the second sliding rod and the hot melt cutting member, and the hot melt cutting member is configured to seal and cut the collecting bag.

16. The method according to claim 15, wherein a detection sensor and a prompt device are further disposed in the excrement collecting box, the detection sensor is configured to detect whether the cut collecting bag is removed, and the using method of an excrement collecting box further comprises:

determining whether the cut collecting bag is removed, and based on a determination result that the cut collecting bag is removed, unfolding a new collecting bag; based on a determination result that the cut collecting bag is not removed, starting the prompt device to prompt a user.

* * * * *